United States Patent
Kalabic et al.

(10) Patent No.: US 10,589,784 B2
(45) Date of Patent: Mar. 17, 2020

(54) SYSTEMS AND METHODS FOR INTENTION-BASED STEERING OF VEHICLE

(71) Applicant: Mitsubishi Electric Research Laboratories, Inc., Cambridge, MA (US)

(72) Inventors: Uros Kalabic, Jamaica Plain, MA (US); Karl Berntorp, Watertown, MA (US); Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 234 days.

(21) Appl. No.: 15/681,728

(22) Filed: Aug. 21, 2017

(65) Prior Publication Data

US 2019/0054955 A1    Feb. 21, 2019

(51) Int. Cl.
| | |
|---|---|
| *B62D 15/02* | (2006.01) |
| *B62D 6/00* | (2006.01) |
| *G05D 1/02* | (2020.01) |
| *G06N 3/04* | (2006.01) |
| *G06N 3/08* | (2006.01) |
| *B62D 5/04* | (2006.01) |

(52) U.S. Cl.
CPC .......... *B62D 15/025* (2013.01); *B62D 6/002* (2013.01); *G05D 1/0221* (2013.01); *G06N 3/0445* (2013.01); *G06N 3/08* (2013.01); *B62D 5/0421* (2013.01); *B62D 5/0463* (2013.01); *G05D 2201/0213* (2013.01)

(58) Field of Classification Search
CPC .... B62D 15/025; B62D 6/002; B62D 5/0421; B62D 5/0463; G05D 1/0221; G05D 2201/0213; G06N 3/0445; G06N 3/08
See application file for complete search history.

(56) References Cited

U.S. PATENT DOCUMENTS

| | | |
|---|---|---|
| 5,918,682 A | 7/1999 | Fan et al. |
| 6,170,600 B1 * | 1/2001 | Shimizu .................. B62D 1/28 |
| | | 180/446 |
| 6,363,305 B1 | 3/2002 | Kaufmann et al. |
| | (Continued) | |

FOREIGN PATENT DOCUMENTS

EP          3095675 A1    11/2016

*Primary Examiner* — Nga X Nguyen
(74) *Attorney, Agent, or Firm* — Gennadiy Vinokur; James McAleenan; Hironori Tsukamoto

(57) ABSTRACT

Systems and methods for an imaging system having a memory with a historical localization dictionary database having geo-located driving image sequences, such that each reference image is applied to a threshold to produce a binary representation. A sensor to acquire a sequence of input images of a dynamic scene. An encoder to determine, for each input image in the sequence, a histogram of each input image indicating a number of vertical edges at each bin of the input image and to threshold the histogram to produce a binary representation of the input image. A visual odometer to compare the binary representations of each input image and each reference image, by matching an input image against a reference image. Wherein the visual odometer determines a location of the input image based on a match between the input image and the reference image.

20 Claims, 13 Drawing Sheets

(56) References Cited

U.S. PATENT DOCUMENTS

| | | |
|---|---|---|
| 8,190,330 B2 | 5/2012 | Lee |
| 8,744,648 B2 * | 6/2014 | Anderson ............ B60W 30/09 |
| | | 701/3 |
| 2006/0064216 A1 | 3/2006 | Palmer |
| 2009/0319113 A1 | 12/2009 | Lee |
| 2013/0274985 A1 | 10/2013 | Lee et al. |
| 2016/0077525 A1 * | 3/2016 | Tomozawa ............ B62D 6/002 |
| | | 701/25 |
| 2017/0217477 A1 | 8/2017 | Akatsuka et al. |

* cited by examiner

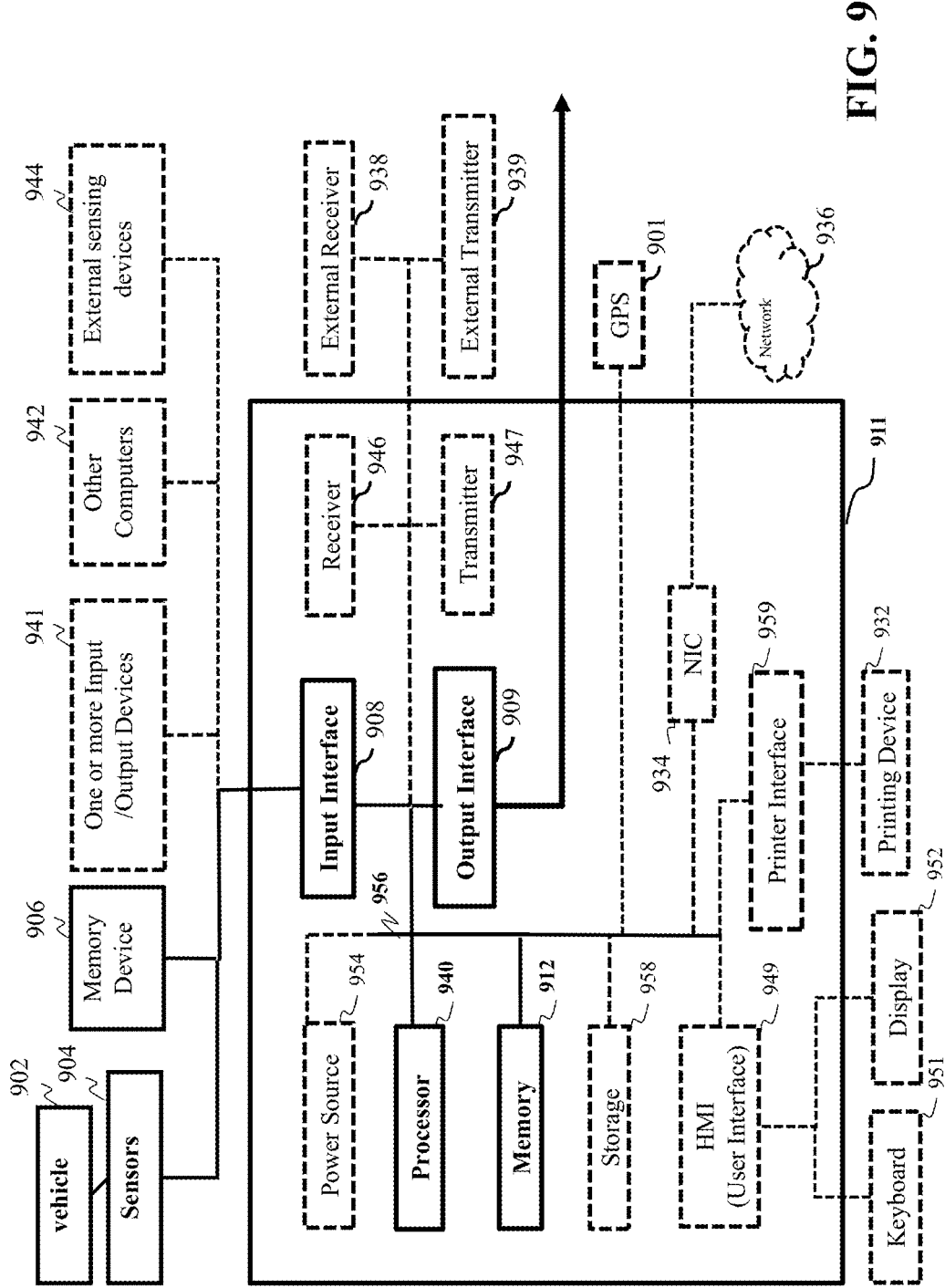

SYSTEMS AND METHODS FOR INTENTION-BASED STEERING OF VEHICLE

FIELD

The present disclosure relates generally to automotive steering systems that operate in both autonomous and manual driving modes, and more particularly to control of the vehicle based on steering intentions of a driver of the vehicle.

BACKGROUND

In conventional mechanical steering systems, a steering wheel is connected via a steering column and a steering rack to one or more vehicle wheels. When the driver applies a rotational motion to the steering wheel, the motion is transferred via the steering column to a pinion. The pinion converts the rotational motion into translational motion of a steering rack, which moves the vehicle wheels. Hence, the steering wheel, the steering rack and the vehicle wheels are mechanically coupled such that the rotation of the steering wheel determines the rotation of the vehicle wheels, and vice versa.

The rotation of the steering wheel for conventional steering systems depends on a torque applied by the driver to the steering wheels. This torque controls a steering angle, a rate of change of the steering angle, and an acceleration of the rotation. Similarly, the rotation of the vehicle wheels depends on a torque applied to the vehicle wheels by an actuator, e.g., a motor arranged in the steering rack to control the rotation of the vehicle wheels. To that end, the torque applied to the vehicle wheels directly depends on the torque applied by the driver.

In conventional active steering systems, an additional actuator, such as a variable gear ratio including a harmonic motor, provides an additional degree of freedom so that the rotation of the vehicle wheels is not directly determined by the rotation of the steering wheel, but can be adjusted based on the speed of the vehicle. In conventional active steering systems, this allows to map the steering wheel torque to the vehicle wheels' torque in dependence of the speed of the vehicle. For example, at lower speeds, the active steering reduces the amount that the steering wheel must be turned, and, thus, effects performance in situations such as parking and other urban area traffic maneuvers. At higher speeds, the performance is such that the normal increased responsiveness from speed is avoided to improve directional stability.

In conventional steer-by-wire systems, there is no mechanical linkage between the steering column and the steering rack. The steering wheel and vehicle wheels coupled to two actuators. One actuator arranged in the steering column controls the rotation of the steering wheel and another actuator arranged in the steering rack controls the rotation of the vehicle wheels. Despite the elimination of the mechanical connection between the steering column and the steering rack, the conventional steer-by-wire systems maintain the relationship between the torque applied by the driver, a tactile feedback to the driver in response to applying the torque, and the torque applied to the vehicle wheels. For example, U.S. Pat. No. 6,363,305, describe a conventional method for generating an appropriate feedback torque on the steering wheel.

During a semi-autonomous driving of the vehicle, a semi-autonomous driving planning (SADP) system can assist the driver while the driver still operates the vehicle. For example, the semi-autonomous driving of the vehicle can be used for collision avoidance, stability recovery, lane keeping, see, U.S. Pat. No. 8,190,330.

Therefore, a need exists in the art for control systems for controlling a movement of a vehicle that overcome the limitations of conventional active steering systems and conventional steer-by-wire systems.

SUMMARY

Embodiments of the present disclosure are directed to steering systems that operate in both autonomous and manual driving modes, and more particularly, to control a mobile machine that transports things, based on steering intentions of a driver of the mobile machine.

The present disclosure is based on a realization that at least one controller of a control system can be configured for controlling and enforcing constraints in a semi-autonomous steering system which can operate in both autonomous and manual modes for mobile machines, by non-limiting example, such as a vehicle. In other words, our realization is that the same controller of a control system of the mobile machine, such as an Electric Power Steering (EPS) controller, can be used to drive in autonomous mode or manual mode. Wherein, at least one add-on feature of the present disclosure, by non-limiting example, can include a reference governor-type feature for the controller to enforce constraints, where the reference governors enforce constraints for systems whose input is a reference, i.e., some desired value to be tracked. Specifically, these constraints correspond to the control system limitations and design safety requirements regarding operating the vehicle. For example, the relative motion of the steering wheel with respect to the motion of the vehicle wheels can be controlled using the constraints, so as to ensure drivability of the vehicle. The constraints on the relative motion of the steering wheel and the vehicle wheels can be based on drivability considerations defining an extent of an angle difference and/or an angular rate difference between steering wheel and vehicle wheels before the driver feels a loss of the control and drivability of the vehicle. The drivability considerations can depend on the type of the vehicle and/or conditions of the movement of the vehicle and the constraint on the relative motion can limit the rapidness of alignment of the wheels angle with the target value.

In order to come to the above technological innovations, we conducted extensive experimentation, and through our experimentation we attained realizations leading us to the systems and methods of the present disclosure.

Initially, we experimented with conventional control systems for vehicles that operate in both autonomous and manual modes to better understand our challenges. We learned that controllers for an autonomous mode are different than the controllers used for manual modes. For example, in autonomous mode, the controllers for vehicles that operate solely in autonomous mode receive inputs including, by-non-limiting example, a desired heading from a path-planning system and pass the desired heading to the controller, which tracks the desired heading. Specifically, the controller actuates the vehicle wheels to a desired angle position that has been passed by a tracking system. In manual mode, the controllers that operate solely in manual mode receive a torque signal, which is measured at the steering wheel, and amplify the torque signal in order to provide the driver with assistive torque. Further, the controllers provide additional torque to assist the driver in actuating the vehicle wheels, in proportion to the amount of torque that the driver has actuated the steering wheel. Thus, the controllers that operate in autonomous mode are different from controllers that operate in manual mode, which is not an option or type of solution we considered.

For example, we did not explore solutions that tried to coordinate two different controllers, a controller for autonomous mode and a controller for manual mode, with a smooth switchover type feature (i.e. switchover feature that switches modes by somehow switching from an autonomous controller to a manual controller, and vice versa). At least one reason that we did not consider this type of smooth switchover feature approach is simply because we derived from our experimentation that such smooth switchover approaches were inefficient and costly, since they require two controllers.

We also experimented with steering control systems for vehicles regarding how a steering wheels' torque may be related to a vehicle wheels' torque. We learned that rotation of the steering wheel depends on a torque applied by the driver to the steering wheels where this torque controls a steering angle, a rate of change of the steering angle, and an acceleration of the rotation, wherein the torque applied to the vehicle wheels directly depends on the torque applied by the driver. In a number of control applications, where we experimented with control of mechanically coupled steering systems, we found that the steering wheels' torque is directly mapped to the vehicle wheels' torque. Further, such a mapping we found may be a multiplication of the steering wheels' torque aiming to assist the driver to control the vehicle. We also learned that similar mapping can be done in the active steering and steer-by-wire systems.

Based on our experimentation, we realized that torque applied to the steering wheel and/or the vehicle wheels is not an objective of the driving, but a method to achieve a driving objective of moving a vehicle toward a desired heading. Specifically, our realization can be thought of, in a way, as "translating" a manually input torque signal to a desired heading (which is the desired heading in which a driver wishes to go), so that the same controller, or a single controller, can be used to enforce constraints and steer the mobile machine, i.e. vehicle, in either of autonomous or manual modes. For example, in autonomous mode, the controller of the control system can actuate the vehicle wheels to a desired angle position that has been passed by a tracking system. In manual mode, the same controller can provide additional torque to assist the driver in actuating the vehicle wheels, in proportion to the amount of torque that the driver has actuated the steering wheel. In both modes, the same controller can enforce constraints which correspond to the control system limitations and design safety requirements, as noted above.

Some embodiments of the present disclosure can include the controller having at least two components. The first component can be a tracking and stabilizing control component, or tracking controller, and the second component can be a constraint-enforcement component that is added as a feature to the tracker controller. The tracking controller, can be designed to either track a desired pinion angle, i.e., angle of the vehicle wheels, and actuate the vehicle wheels to a desired vehicle angle, or track a manual torque input from a driver, depending upon the type of action. The constraint-enforcement component can include a feature added to the tracker controller that is constrained, e.g., so as to obtain achievable steering and pinion shaft angles, as well as to obtain allowable rates of change. In other words, the constraint-enforcement component modifies the desired reference angle input to a constraint-admissible reference angle, and passes this modified reference angle to the tracking controller, wherein enforcement of these constraints can be by a reference governor. The reference governor can be an add-on feature placed before a closed-loop system in order to enforce system constraints, thereby ensuring safe and reliable operation. For example, in autonomous mode, the constraint-enforcement component, passes a reference angle to the tracker controller. In manual mode, the driver actuates the steering wheel and the driver torque can be converted to a reference wheel angle, so that the reference angle corresponds to a torque that is proportional to the driver torque measured by the torque sensor. At least one aspect behind the present disclosure is to convert the driver's torque into a desired vehicle angle, so that the same controller can be used to control the vehicle wheels, in both autonomous and manual modes, as noted above. This configuration can effectively track a reference angle in autonomous mode, and provide a helping torque to the driver in manual mode, while the underlying controller does not change depending on the mode of operation, among other things.

Other aspects of the overall steering controller for some embodiments may be modular, such that the tracking and stabilizing control, or tracker controller, can be constructed without regard to constraints, and the reference governor feature can then be structured to modify the tracking reference input in order to enforce constraints.

Some embodiments of the present disclosure can include a controller that maps a steering angle to a torque applied to the vehicle wheels and controls the method of the driving and not the driving itself. In regard to this mapping, the objective of control can be the torque applied to the wheels. However, we discovered from experimentation, that such an objective of control does not always correspond to the objective of the driver wanting to change a direction, and, thus, the mapping control relies on experience of the driver to apply the correct torque to the steering wheel. Notably, the mapping between the steering angle and the torque applied to the vehicle wheels can vary for different vehicles. Hence, drivers may need to adjust their sense of selection of the correct torque upon changing the vehicles.

Hence, we had another realization to overcome this problem. This is that the steering angle can be mapped not to the torque, but to a desired heading of the vehicle intended by a driver, i.e., mapping a measured torque at the steering wheel to the driver's estimated desired heading or intended path. Specifically, in such a manner, the objective of control becomes to change the direction of the vehicle toward the desired heading, wherein an objective of control allows the application of various control techniques in addition to, and/or instead of, the mapping. Additionally, we discovered that when the objective of control is the desired heading of the vehicle, such an objective corresponds to the objective of driving an autonomous vehicle, and the feedback controller may be reused. Such an objective of control is advantageous for a number of driving applications. Specifically, formulating intentions of the driver expressed through the steering angle as a reduction of the error between the current heading of the vehicle and the desired heading allows to apply various control techniques in addition to or instead of the mapping, as noted above.

For example, some embodiments use a feedback controller to track the desired heading. The feedback controller tracking the desired heading is more flexible than the mapping controller and can be configured to adapt the tracking to various conditions of driving. For example, such a feedback controller can mitigate disturbances acting on the vehicle, produce stable control inputs satisfying the constraints, and mitigate measurement uncertainty.

In addition, when the objective of control is the desired heading of the vehicle, such an objective corresponds to the objective of driving an autonomous vehicle. For example, during a semi-autonomous driving of the vehicle, a semi-autonomous driving planning (SADP) system can assist the driver while the driver still operates the vehicle. The SADP determines a target value for a heading of the vehicle, regardless of the steering angle, which may result in different controllers for autonomous and manual driving modes.

However, some embodiments convert the steering angle to the desired heeding of the vehicle. To that end, the control of the movement of the vehicle in manual and the autonomous modes become uniform and the embodiments can reuse the controller used in the autonomous mode. Such a reuse simplifies the control architecture of the semi-autonomous driving.

According to an embodiment of the present disclosure, a control system for controlling a movement of a vehicle. The control system includes a receiver to receive a signal indicative of an applied torque input to a steering wheel of the vehicle. A mapper to map the received signal to a desired heading of the vehicle based on internal states of the vehicle. A sensor to obtain vehicle data including a measure of a current heading of the vehicle. A feedback controller to control the movement of the vehicle causing the current heading of the vehicle to track the desired heading of the vehicle.

According to another embodiment of the present disclosure, a method for controlling a movement of a vehicle. Wherein the method uses a processor coupled with stored instructions implementing the method, such that the instructions, when executed by the processor carry out at least some steps of the method. The method including receiving a signal indicative of a steering angle of a steering wheel of the vehicle. Mapping the received signal to a desired heading of the vehicle using a mapper based on internal states of the vehicle. Receiving vehicle data via a sensor, such that the vehicle data includes a measure of a current heading of the vehicle. Controlling the movement of the vehicle using a feedback controller, for causing the current heading of the vehicle to track the desired heading of the vehicle According to another embodiment of the present disclosure, a non-transitory computer readable storage medium embodied thereon a program executable by a processor for performing a method. The method includes receiving a signal indicative of a steering angle of a steering wheel of the vehicle. Mapping the received signal to a desired heading of the vehicle using a mapper based on internal states of the vehicle. Receiving vehicle data via a sensor, such that the vehicle data includes a measure of a current heading of the vehicle. Controlling the movement of the vehicle using a feedback controller. Wherein a gate is to pass to the feedback controller a value of the desired heading of the vehicle determined by the mapper, when the vehicle is in a manual mode, and otherwise, to pass to the feedback controller a value of the desired heading of the vehicle determined by a semi-autonomous driving planning (SADP) system to the feedback controller, when the vehicle is in an autonomous mode, for causing the current heading of the vehicle to track the desired heading of the vehicle.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 9 is a block diagram of illustrating the method of FIG. 1A, that can be implemented using an alternate computer or processor, according to embodiments of the present disclosure.

Figure 1A:
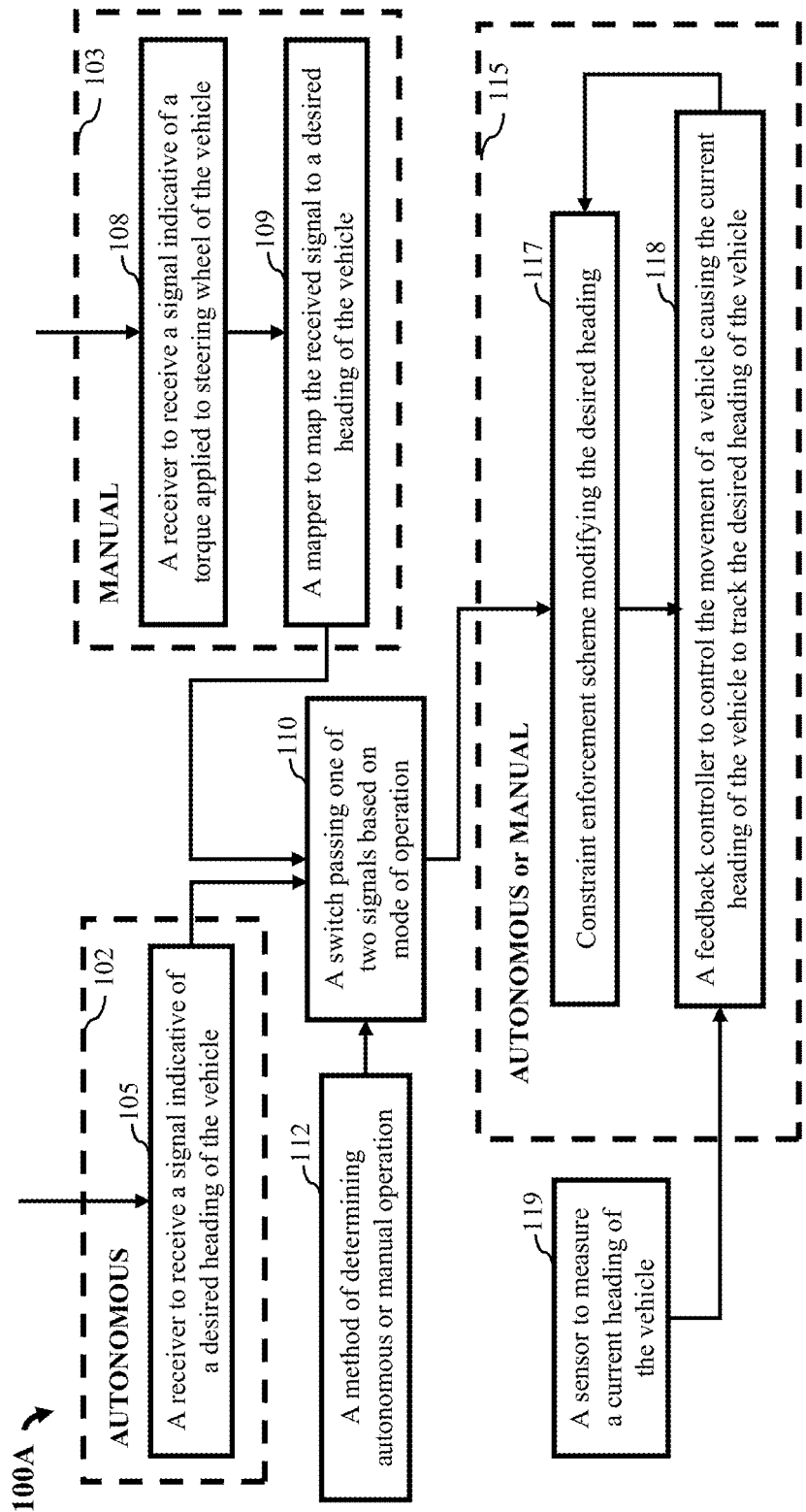
FIG. 1A is a block diagram of some flow process steps of a method for a control system for controlling a movement of a vehicle, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of present disclosure are directed to automotive steering systems which operate in both autonomous and manual driving modes, and more particularly, to control of a vehicle based on steering intentions of a driver of the vehicle.

The present disclosure is based on a realization that at least one controller of a control system, can be configured for controlling and enforcing constraints in a semi-autonomous steering system which can operate in both autonomous and manual modes for mobile machines, by non-limiting example, such as a vehicle. In other words, our realization is that the same controller of a control system of the mobile machine, such as an Electric Power Steering (EPS) controller, can be used to drive in autonomous mode or manual mode, wherein at least one add-on feature of the present disclosure, by non-limiting example, can include a reference governor-type feature for the controller to enforce constraints, where the reference governor enforces constraints for systems whose input is a reference, i.e., some desired value to be tracked. Specifically, these constraints correspond to the control system limitations and design safety requirements regarding operating the vehicle. For example, the relative motion of the steering wheel with respect to the motion of the vehicle wheels can be controlled using the constraints, so as to ensure drivability of the vehicle. The constraints on the relative motion of the steering wheel and the vehicle wheels can be based on drivability considerations defining an extent of an angle difference and/or an angular rate difference between steering wheel and vehicle wheels before the driver feels a loss of the control and drivability of the vehicle. The drivability considerations can depend on the type of the vehicle and/or conditions of the movement of the vehicle and the constraint on the relative motion can limit the rapidness of alignment of the wheels angle with the target value.

Further, the values for the steering angle and the wheels' angle tracking the target value of the wheels' angle can be subject to constraints including a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels. Some embodiments of the present disclosure can generate control commands to a column motor and a rack motor according to the values for the steering angle and the wheels angle to achieve the coordinated control of the steering wheel and the vehicle wheels during the semi-autonomous mode of driving the vehicle.

In order to come to the above technological innovations, we conducted extensive experimentation and through our experimentation we attained realizations leading us to the systems and methods of the present disclosure.

Based on our experimentation, we realized torque applied to the steering wheel and/or the vehicle wheels is not an objective of the driving, but a method to achieve a driving objective of moving a vehicle toward a desired heading. Specifically, our realization can be thought of, in a way, as "translating" a manually input torque signal to a desired heading (which is the desired heading in which a driver wishes to go) so that the same controller, or a single controller, can be used to enforce constraints and steer the mobile machine, i.e., vehicle, in either of autonomous or manual modes. For example, in autonomous mode, the controller of the control system can actuate the vehicle wheels to a desired angle position that has been passed by a tracking system. In manual mode, the same controller can provide additional torque to assist the driver in actuating the vehicle wheels, in proportion to the amount of torque that the driver has actuated the steering wheel. In both modes, the same controller can enforce constraints which correspond to control system limitations and design safety requirements, among other constraints.

Some embodiments of the present disclosure can include the controller having at least two components. The first component can be a tracking and stabilizing control component, or tracking controller, and the second component can be a constraint-enforcement component that is added as a feature to the tracker controller. The tracking controller, can be designed to either track a desired pinion angle, which is proportionally related to the angle of the vehicle wheels, and actuate the vehicle wheels to a desired vehicle angle.

The constraint-enforcement component can include a feature added to the tracker controller that enforces constraints, so as to, for example, obtain achievable steering and pinion shaft angles or allowable rates of change. In other words, the constraint-enforcement component modifies the desired reference angle input to a constraint-admissible reference angle, and passes this modified reference angle to the tracking controller. The reference governor can be an add-on feature placed before a closed-loop system, in order to enforce system constraints, and thereby ensure safe and reliable operation. For example, in autonomous mode, the constraint-enforcement component passes a reference angle to the tracker controller. In manual mode, the driver actuates the steering wheel and the driver torque can be converted to a reference wheel angle, so that the reference angle corresponds to a torque that is proportional to the driver torque measured by the torque sensor. At least one aspect behind the present disclosure is to convert the driver's torque into a desired vehicle angle, so that the same controller can be used to control vehicle steering in both autonomous and manual modes, as noted above. This configuration can effectively track a reference angle in autonomous mode, and provide a helping torque to the driver in manual mode, while the underlying controller does not change depending on the mode of operation, among other things.

Aspects of the overall steering controller for some embodiments may be modular, such that the tracking and stabilizing control, or tracker controller, can be constructed without regard to constraints, and the reference governor feature can then be structured to modify the tracking reference input in order to enforce constraints.

Further, some embodiments of the present disclosure can include a controller that maps a steering angle to a torque applied to the vehicle wheels and controls the method of the driving and not the driving itself. In regard to this mapping, the objective of control can be the torque applied to the wheels. However, we discovered from experimentation, that such an objective of control does not always correspond to the objective of the driver wanting to change a direction and thus the mapping relies on experience of the driver to apply the correct torque to the steering wheel. Notably, the mapping between the steering angle and the torque applied to the vehicle wheels can vary for different vehicles. Hence, drivers may need to adjust their sense of selection of the correct torque upon changing the vehicles.

Hence we had another realization to overcome this problem. This is that the steering angle can be mapped not to the torque, but to a desired heading of the vehicle intended by a driver, i.e., mapping a measured torque at the steering wheel to the driver's estimated desired heading or intended path. Specifically, in such a manner, the objective of control becomes to change the direction of the vehicle toward the desired heading, wherein an objective of control allows to apply various control techniques in addition and/or instead of the mapping. Additionally, we discovered that when the objective of control is the desired heading of the vehicle, such an objective corresponds to the objective of driving an autonomous vehicle, and the feedback controller may be reused. Such an objective of control is advantageous for a number of driving applications. Specifically, formulating intentions of the driver expressed through the steering angle as a reduction of the error between the current heading of the vehicle and the desired heading allows to apply various control techniques in addition or instead of the mapping, as noted above.

For example, some embodiments use a feedback controller to track the desired heading. The feedback controller tracking the desired heading is more flexible than the mapping controller and can be configured to adapt the tracking to various conditions of driving. For example, such a feedback controller can mitigate disturbance of the vehicle, produce stable control satisfying the constraints, and/or consider uncertainties of measurements.

In addition, when the objective of control is the desired heading of the vehicle, such an objective corresponds to the objective of driving an autonomous vehicle. For example, during a semi-autonomous driving of the vehicle, a semi-autonomous driving planning (SADP) system can assist the driver while the driver still operates the vehicle. The SADP determines a target value for a heading of the vehicle, regardless of the steering angle, which may result in different controllers for autonomous and manual driving modes.

However, some embodiments convert the steering angle to the desired heeding of the vehicle. To that end, the control of the movement of the vehicle in manual and the autonomous modes become uniform and the embodiments can reuse the controller used in the autonomous mode. Such a reuse simplifies the control architecture of the semi-autonomous driving.

FIG. 1A shows a block diagram of some flow process steps of the method for a control system for controlling a movement of a vehicle, according to embodiments of the present disclosure. In particular, FIG. 1A shows the method 100A that tracks a prescribed vehicle heading in either autonomous or manual mode. Note, it is possible that a prescribed vehicle heading could be a trajectory that is sent to the autonomous mode where after step 105, a mapper could map to a desired heading. In the diagram, there are two possible modes of operation: an autonomous mode 102 and a manual mode 103. In autonomous mode, a receiver 105 receives a desired vehicle heading from a higher-level path-planning system.

In manual mode, the driver actuates the steering wheel and the receiver 108 receives a measurement of this torque; the torque is then converted to a desired vehicle heading by a mapper 109 through a process to be detailed further in the following. The torque-to-angle conversion attempts to estimate the driver's inner, desired vehicle heading. This conversion allows for the use of a single controller in either autonomous or manual mode for the purpose of achieving a desired vehicle heading. The method capturing the functions of this controller is bounded by the box 115. The method consists of two components: a constraint-enforcing scheme 117, and a feedback controller 118. The constraint-enforcing scheme 117 uses a state measurement or estimate from the feedback controller to modify the desired vehicle heading with the intention of enforcing system constraints. The feedback controller 118 receives a measurement of the current vehicle heading from a sensor 119 and is designed to actuate the steering column in such a way that the measured vehicle heading closely track the desired vehicle heading.

Still referring to FIG. 1A, a switch 110 can be used to determine which signal, autonomous or manual, to pass to the control method 115. The switch determines which signal to pass by a command received from a method 112 designed for this purpose. In the simplest case, the method 112 can be a signal passed by the driver through the push of a button, deciding which mode the vehicle should operate in; more complex cases may involve a learning-based system which determines when to hand off control from driver to path-planning system and vice versa. For example, the reference signal can be a torque signal from a driver that relates to the amount of torque to be applied to the vehicle wheels; a reference angle signal from a supervisory system that relates to the angle at which the wheels should be turned; a reference heading signal from a supervisory system that relates to the direction in which the vehicle should move.

Figure 1B:
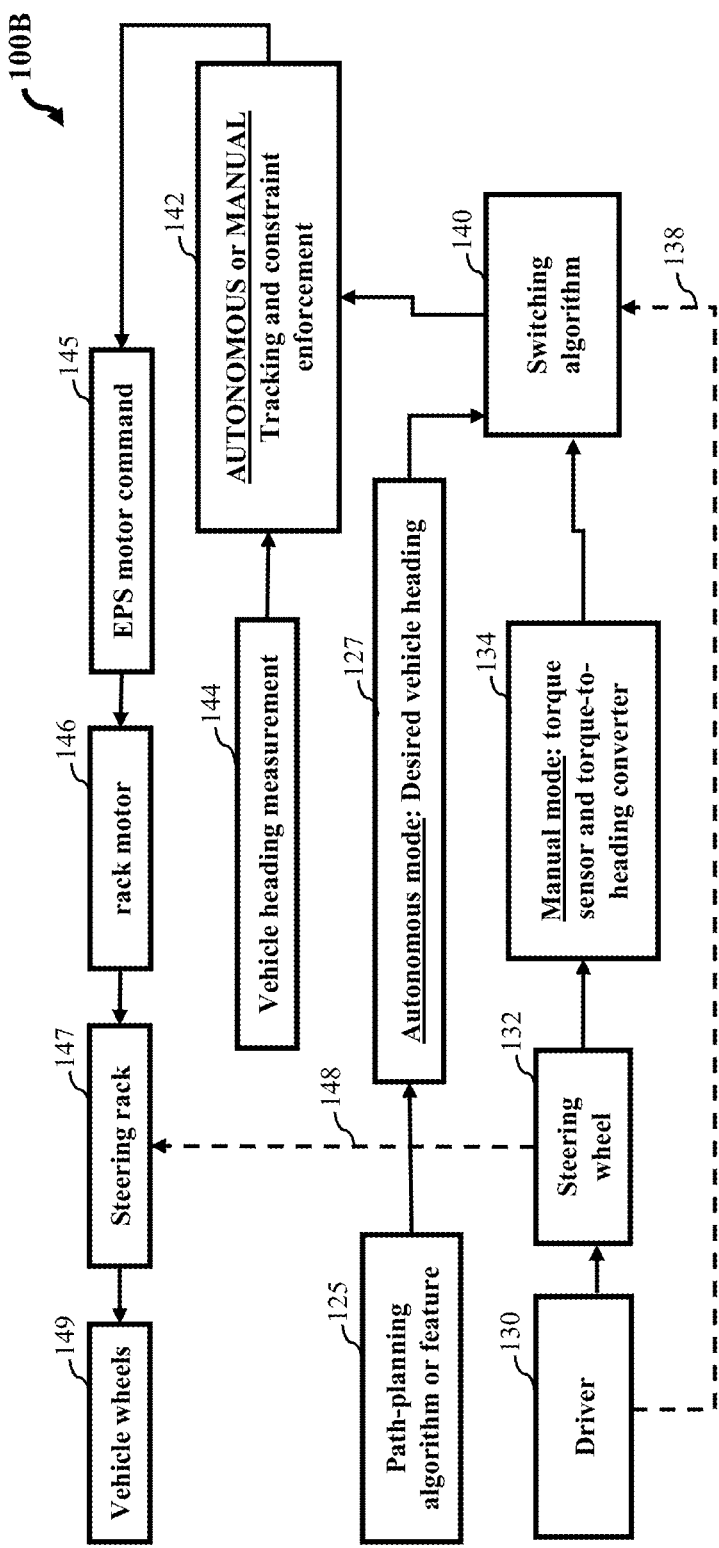
FIG. 1B is a block diagram of some flow process steps of the method of FIG. 1A, that further provides features including the path-planning algorithm, according to embodiments of the present disclosure.

FIG. 1B is a block diagram of some flow process steps of the method of FIG. 1A, that further provides features including the path-planning algorithm, according to embodiments of the present disclosure. Wherein the method 100B can include the contents of the autonomous system block 102, manual system block 103, and dual-mode block 115 represented by 127, 134, and 142, respectively. In autonomous mode, a path-planning algorithm 125, which programmatically decides the desired vehicle path and the required vehicle heading, passes the desired vehicle heading 127 to a switching algorithm 140. In manual mode, the human driver 130 actuates a steering wheel 132. The torque from the driver on the steering wheel is measured by a torque sensor and this torque is converted to a desired vehicle heading by an algorithm that is an aspect of the present disclosure. This torque is passed to the switching algorithm 140, which decides whether to pass the autonomous or manual input. Note that the switching algorithm may take the driver's input 138. The switching algorithm passes the desired vehicle angle to the controller 142, which performs constraint enforcement and tracking of the desired vehicle heading passed by the switch by the vehicle heading measurement 144. The tracking controller passes a motor command 145 to the steering motor 146, which actuates the steering column 147. Note that the driver may directly actuate the steering rack 147 via a steering wheel-to-rack connection 148. This is not necessary for some embodiments of the present disclosure, for example, if a connection does not exist, the steering system is usually referred to as a drive-by-wire system.

Figure 1C:
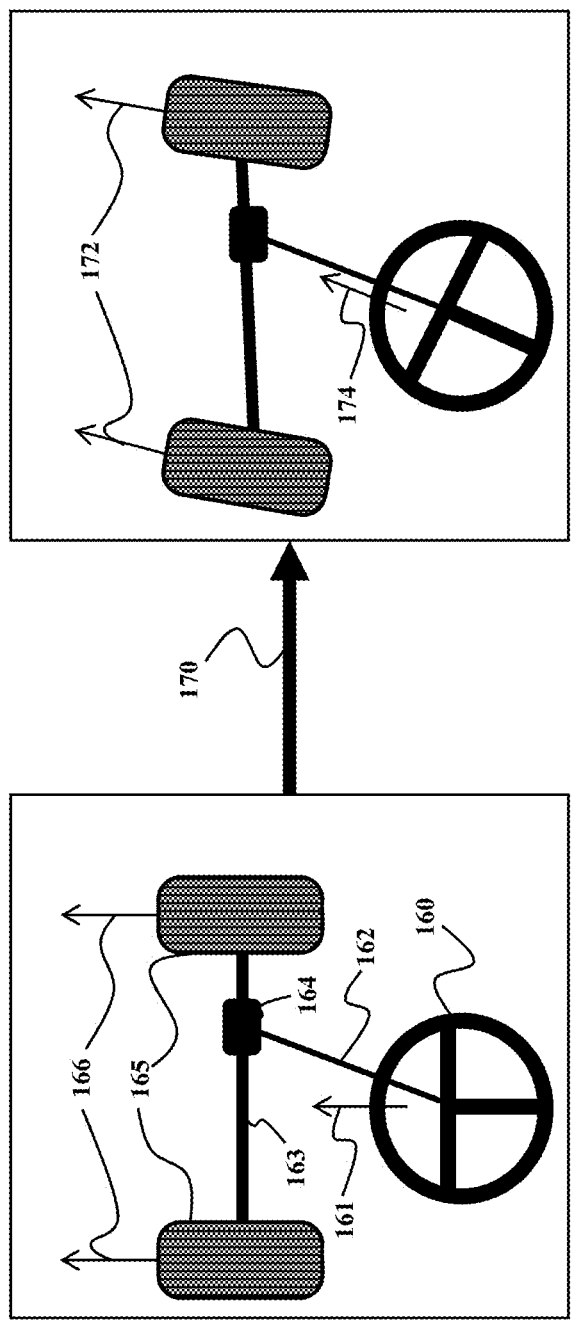
FIG. 1C a schematic of a physical steering system, according to embodiments of the present disclosure.

Referring to FIG. 1C, FIG. 1C is a schematic of a physical steering system, according to embodiments of the present disclosure. The physical steering system 100C can include the driver actuating a steering wheel 160 to a certain direction 161. The steering wheel can be connected to the wheels via a steering column 162, in which case the driver actuates the vehicle wheels. The steering column 162 and shaft 163 connecting the vehicle wheels 165 is actuated by a rack motor 164. The rack motor actuates the steering wheel to change the direction 172 of the vehicle wheels. At the same time, the direction 174 of the steering is changed, since the steering wheel shaft is actuated so that the direction of the wheels corresponds to the direction of the steering wheel.

We understand from experimentation that a method can be designed for autonomously operated vehicles that has steering control systems. The steering control system can include a desired heading that is passed to a tracking controller, which passes a signal to an Electronic Power Steering (EPS) motor to ensure tracking of the desired heading. Further, a reference governor-type approach can be used in the case of autonomous operation, since autonomous operation tracks a desired reference signal. Specifically, the reference governor, can be an add-on scheme applied to tracking controllers solely as a constraint-enforcement scheme, which determines a reference input for the tracking controller that can be deemed to be constraint admissible.

We also understand from experimentation that a method can be designed for manually operated vehicles that have steering control systems. For example, the steering control system can measure the torque at the steering wheel which can be amplified using an amplifier, which passes a signal to the EPS motor in order to provide helping torque to the driver. Further, a Model Predictive Control (MPC)-type approach is more appropriate for use in the case of manual operation, since manual operation directly determines an actuator signal and MPC is designed to directly manipulate actuator signals.

However, we learned from the above experimented steering control systems that they both are fundamentally different from the embodiments of the present disclosure. For example, when we compared the two experimental steering control system to the embodiments of the present disclosure, we realized at least one problem, among many problems. That is, both of the experimented constraint-enforcement approaches are much more computationally heavier or computationally costlier, in that they require more computational resources than the controller that does not consider constraints. This means that using both of the experimented constraint-enforcement approaches in parallel would be undesirable compared to just using one type of constraint enforcement mechanism, as according to the present disclosure. According to the present disclosure, we provide a method to allow the reference governor to be used in both autonomous and manual modes of operation. For example, the constraint-enforcement scheme can include the method 600, wherein the scheme itself can be called a reference governor, which is a constraint-enforcement scheme, designed to be added on to feedback controllers that have been designed without taking constraints into account (see FIG. 6).

Figure 2:
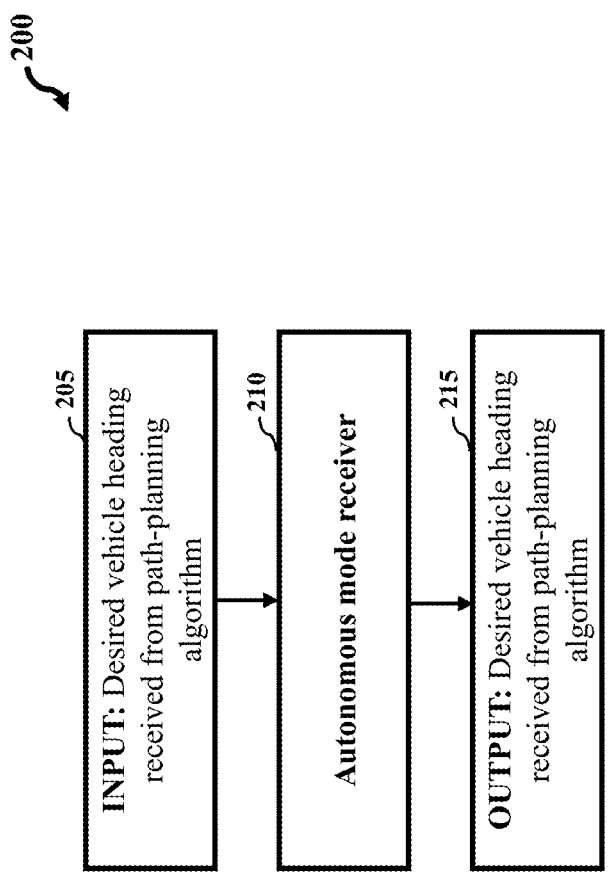
FIG. 2 is a block diagram illustrating the autonomous mode receiver of FIG. 1A, according to embodiments of the present disclosure.

FIG. 2 is a block diagram illustrating the autonomous mode receiver 105 of FIG. 1A, according to embodiments of the present disclosure. The autonomous mode receiver can include the method 200, wherein the desired heading of the vehicle 205 can be received from a path-planning scheme and can be directly passed through to the autonomous mode receiver 210, and outputted as the desired vehicle heading received from the path-planning algorithm 215.

Figure 3:
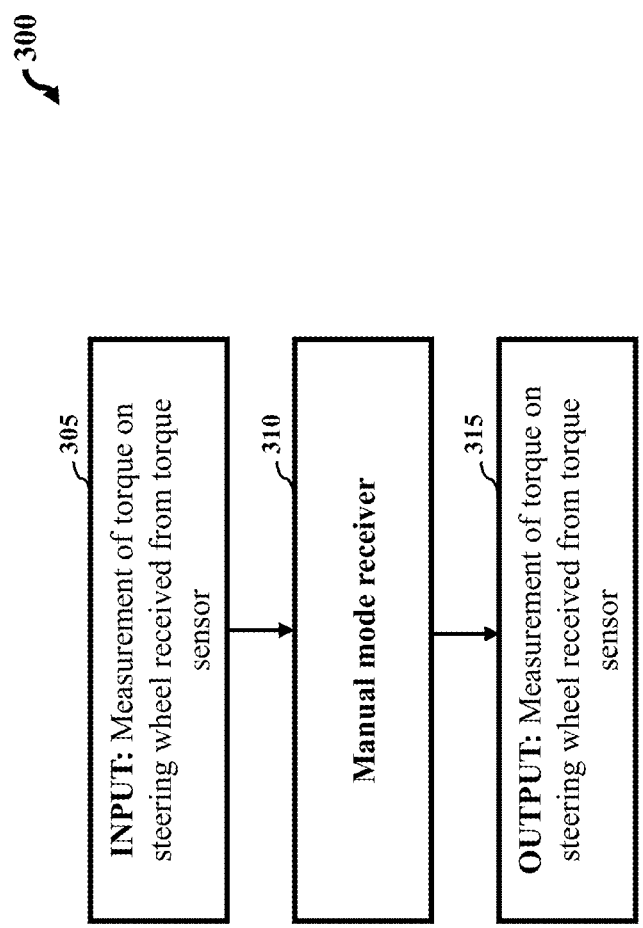
FIG. 3 is a block diagram illustrating the manual mode receiver of FIG. 1A, according to embodiments of the present disclosure.

FIG. 3 is a block diagram illustrating the manual mode receiver 108 of FIG. 1A, according to embodiments of the present disclosure. The manual mode receiver can include the method 300, wherein the input, the torque signal 305 can be received from a sensor attached to the steering wheel and can be directly passed through to the manual mode receiver 310, and outputted as a measurement of torque on the steering wheel received from the torque sensor 315.

Figure 4:
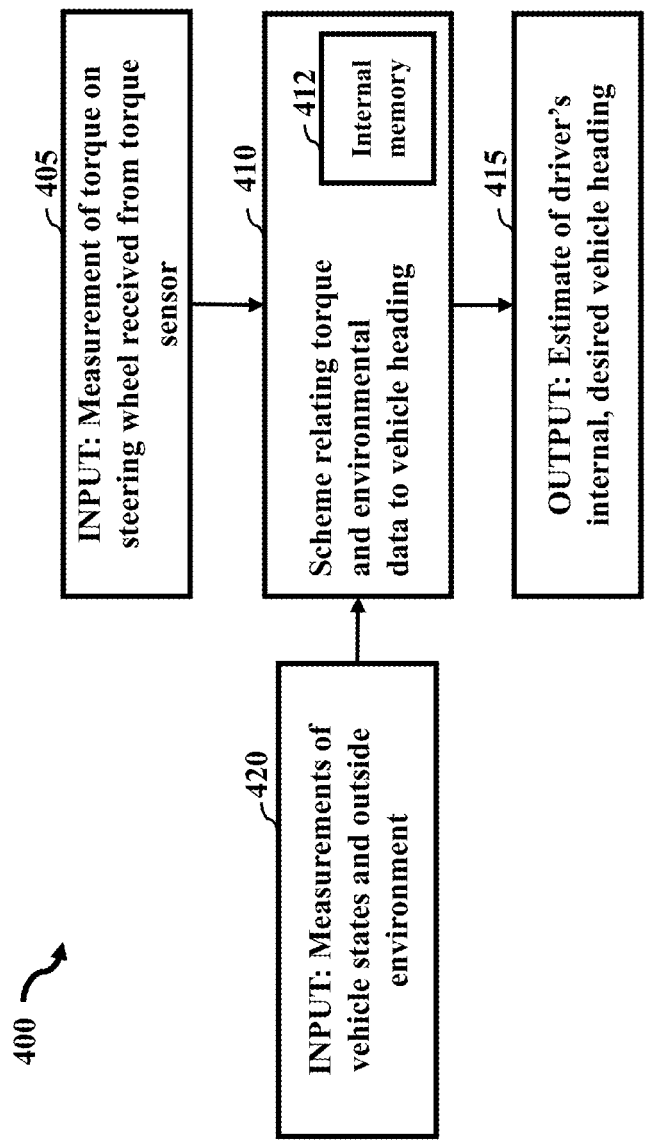
FIG. 4 is a block diagram illustrating the mapper of FIG. 1A, according to embodiments of the present disclosure.

FIG. 4 is a block diagram illustrating the mapper 109 of FIG. 1A, according to embodiments of the present disclosure. The mapper can include the method 400, wherein the mapper receives the steering wheel torque signal 405 along with additional information about the state of the vehicle and its surrounding environment 520. The mapper can have an internal memory 412 along with a programmed scheme 410 which can be used to estimate the driver's desired vehicle heading 515. The scheme itself can be a pre-programmed map, determined through the experience of a calibration engineer, which is at least one way to estimate desired headings from an available torque sensor and from environmental data. Furthermore, the scheme can be a sophisticated learning algorithm, which modifies itself based on the behavior of the driver through driving of the vehicle.

As a non-limiting example of how the vehicle heading can be determined from the driver's torque on the steering wheel, the mapper may determine the heading from the measured torque along with vehicle states that signify the type of maneuver that the driver may be attempting to perform with the torque with which he is actuating the steering wheel. These states may include, and are not limited to, the position of the vehicle, the speed of the vehicle, the current vehicle heading, the instantaneous directions of the vehicle wheels, the planned path of the vehicle, the weather conditions on the road, and the driver's state of mind as determined by, for example, an in-car mood recognition system. Furthermore, the states may be directly measured or indirectly estimated from vehicle data. As a more specific, non-limiting example of how the vehicle heading can be determined from the driver's torque on the steering wheel, the driver can be modeled as a control system whose input is a desired heading and output is a steering wheel torque and which depends on the states of the vehicle; the inverse of this model can be used as a map from the steering wheel torque and other vehicle states to the desired heading.

The mapper is not necessarily limited to mapping the steering input to the vehicle heading. In another embodiment, the mapper maps the steering input to the desired steering wheel angle; this is preferred when there is no environmental data available to the mapper. The steering angle can be used in the same way as the vehicle heading, i.e., it can be the output of a path-planning algorithm and a tracking controller can be designed to track a desired steering input.

Figure 5:
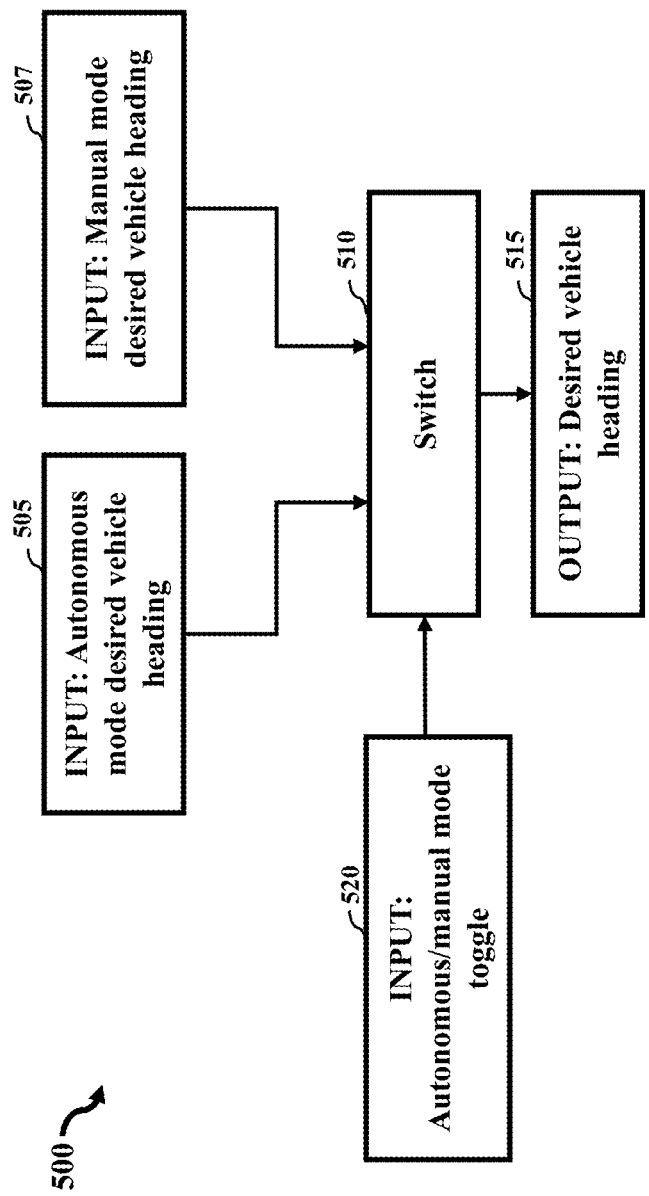
FIG. 5 is a block diagram illustrating the switch of FIG. 1A, according to embodiments of the present disclosure.

FIG. 5 is a block diagram illustrating the switch 110 of FIG. 1A, according to embodiments of the present disclosure. The switch can include the method 500, wherein the switch receives a desired heading from the operation of the autonomous mode 505 and from the operation of the manual mode 507. The switch 510 outputs one of these two signals 515 based on the value of a toggle 520; if the toggle is set to autonomous mode operation, the switch passes the signal from the autonomous mode operation; if the toggle is set to manual mode operation, the switch passes the signal from the manual mode operation. The value of the toggle can be determined through the input of the driver, wherein the driver, for example, pushes a button to determine the operating mode of the vehicle. Furthermore, the toggle can be determined using a more sophisticated scheme in which the vehicle's internal operating system determines the preferred mode of operation, performing a hand-off between autonomous system and driver; for example, this could be implemented in a situation where the environmental conditions are deemed too difficult for autonomous mode operation and a hand-off to the driver is deemed to be preferable.

Figure 6:
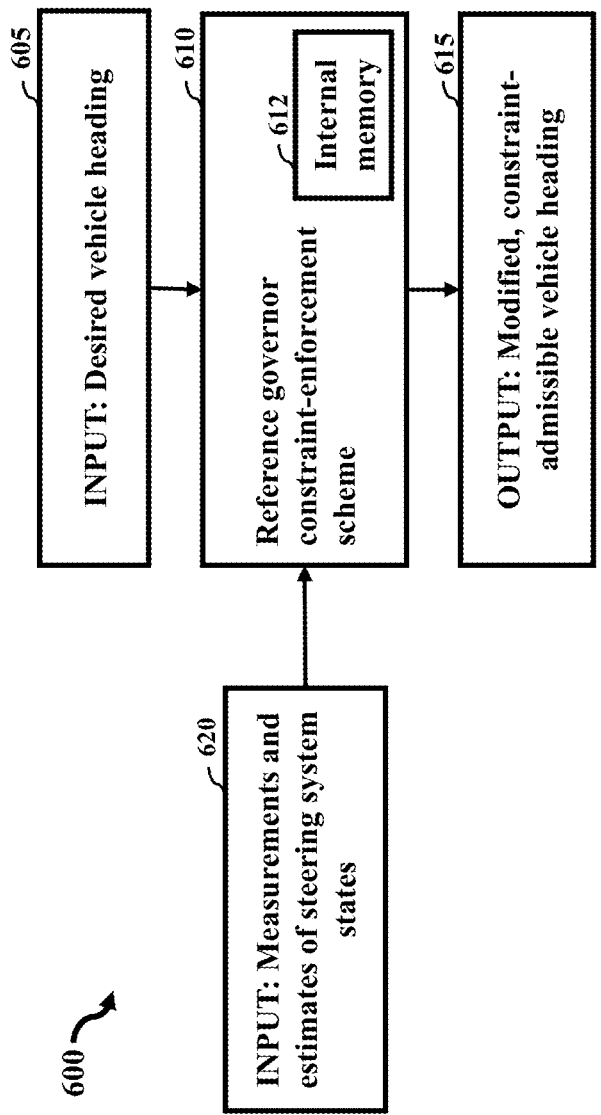
FIG. 6 is a block diagram illustrating the constraint-enforcement scheme of FIG. 1A, according to embodiments of the present disclosure.

FIG. 6 is a block diagram illustrating the constraint-enforcement scheme 117 of FIG. 1A, according to embodiments of the present disclosure. As noted above, the constraint-enforcement scheme can include the method 600, wherein the scheme itself can be called a reference governor, which is a constraint-enforcement scheme, designed to be added on to feedback controllers that have been designed without taking constraints into account. The reference governor 610 receives the desired vehicle heading 605 and modifies it to a constraint-admissible vehicle heading 615. This is done by comparing the reference input, i.e., the desired to vehicle heading 605, and the current state of the steering wheel system 620 to a set of safe reference-input/current-state pairs stored in internal memory 612. If the reference input is deemed unsafe, the closest reference input that can be deemed safe is chosen and passed as the modified reference input 615.

Figure 7A:
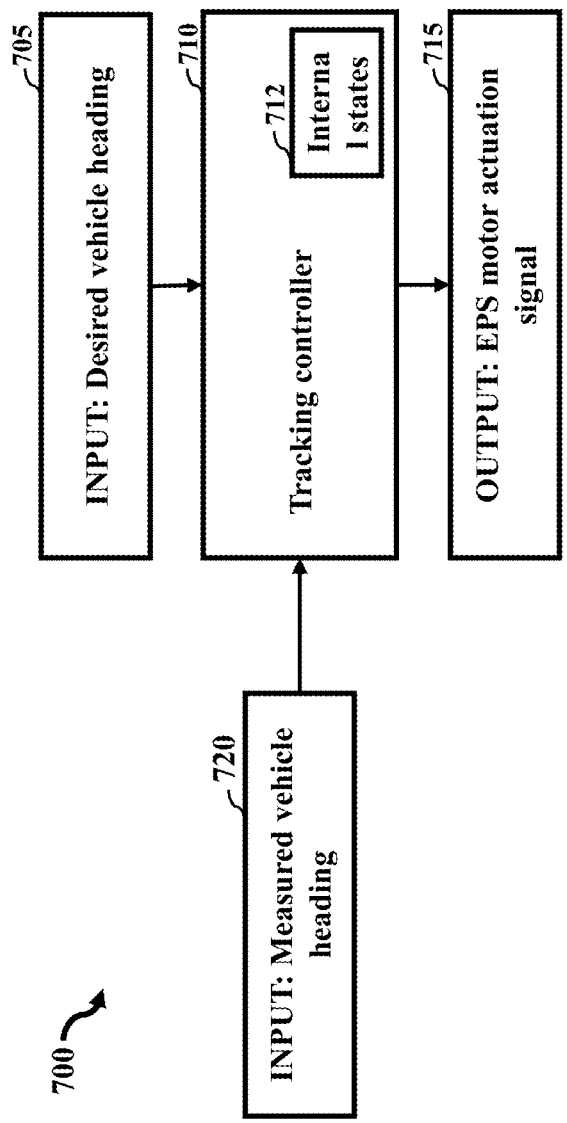
FIGS. 7A and 7B are block diagrams illustrating the feedback controller of FIG. 1A, can be designed as a tracking controller, according to embodiments of the present disclosure.

FIG. 7A is a block diagram illustrating the feedback controller 118 of FIG. 1A, can be designed as a tracking controller, according to embodiments of the present disclosure. The feedback controller/tracking controller can include the method 700, wherein the tracking controller 710 receives both the desired vehicle heading 705 and the current, measured vehicle heading 720, measurements or estimates of steering system states and its own controller states 712. The tracking controller is designed to use this information to determine an actuator signal 715 for the EPS motor, which ensures that the measured heading 720 asymptotically approaches the desired heading 705.

Figure 7B:
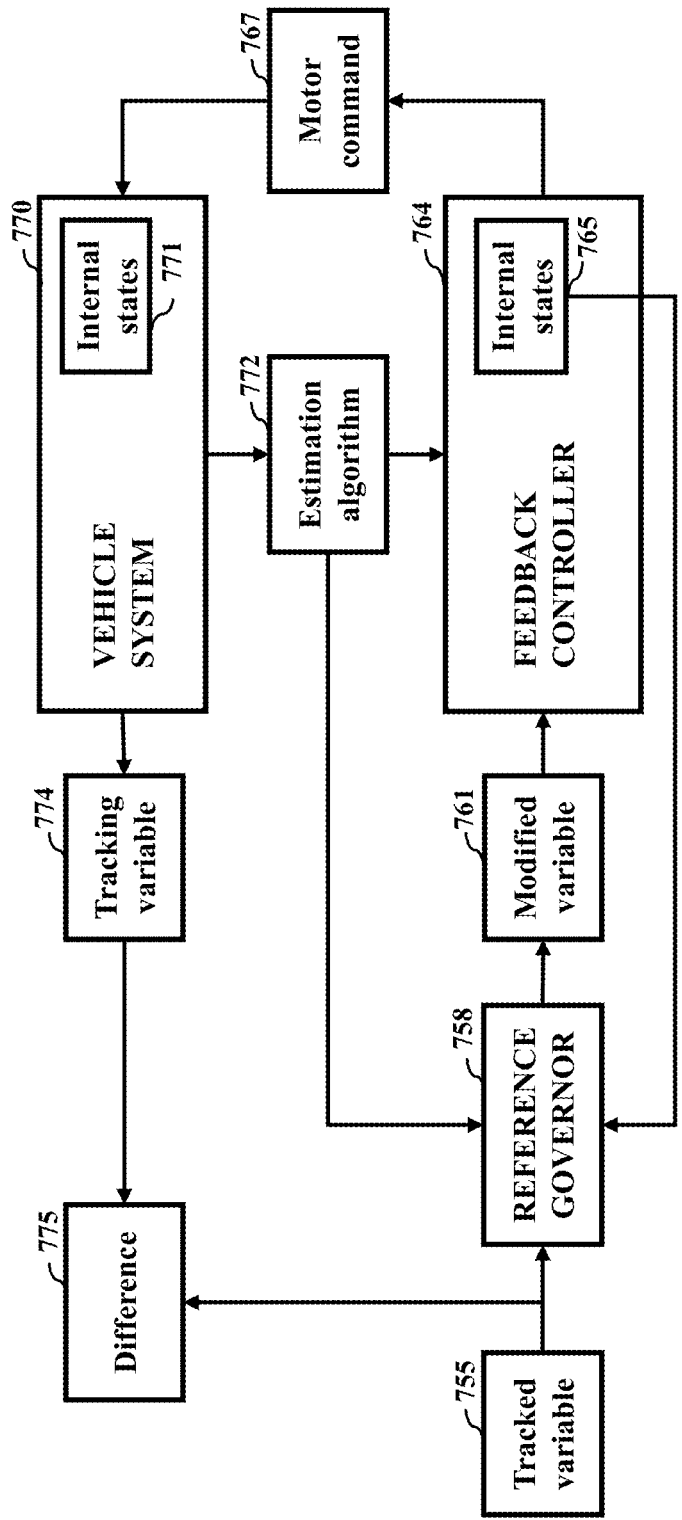

FIG. 7B shows an exemplar implementation of the operation of the tracking controller and the reference governor. Their operation is linked, as described in the following. The tracking controller 764 is designed with the recognition that the operation of the steering system can be modeled using a differential equation $$\dot{X}=f(X)+g(X)U \quad (1)$$

where X represents the internal states 771 of the steering system and U is the motor command 767 to the actuator; internal states include and are not necessarily limited to the position of the steering wheel, the position of the vehicle wheels, and their rates of change. The heading of the vehicle or the tracking variable 774, i.e., the variable representing whichever quantity needs to track the desired variable 755, can be represented by the algebraic equation $$Y=h(X). \quad (2)$$

The motor command U is determined by the tracking controller 764 through the solution to another differential equation $$\dot{\tilde{X}}=\tilde{f}(\tilde{X})+\tilde{g}_1(\tilde{X})\hat{X}+\tilde{g}_2(\tilde{X})R \quad (3)$$

where $\tilde{X}$ represents the internal states 765 of the controller, which do not necessarily represent any particular physical quantity; $\hat{X}$ represents the estimated values of the internal states X since typically internal states are not directly measured and must be estimated via an estimation algorithm 772; R represents the desired heading, or the desired value of whichever quantity is being tracked 755. The differential equation (3), along with the algebraic equation $$U=\tilde{h}(\tilde{X}) \quad (4)$$

is designed so that the value Y tracks the desired value R, that is, Y approaches R so that the difference 775 between the two stays small.

The system described by the equations (1) and (2) is constrained. For example, the vehicle wheels are physically constrained from rotating more than a certain amount. Other constraints on the system include constraints on the rates of change of the steering wheel or vehicle wheels however, in principle, the constraint could be anything on the internal states X and $\tilde{X}$ and the desired value R; mathematically the constraint can be described by a set-membership relation where the tuple (X, $\tilde{X}$, R) must remain in a constraint set C $$(X,\tilde{X},R)\in C. \quad (5)$$

The reference governor 758 is designed to modify the value R from R to a modified value V 761, so as to ensure constraint adherence in (5). In one embodiment, if the tuple (X, $\tilde{X}$, R) does not satisfy the constraint, the reference governor chooses the closest V such that $$(\hat{X},\tilde{X},V)\in C \quad (6)$$

where $\hat{X}$ was used to signify that only the estimated state 772 may be available to the reference governor.

Figure 8A:
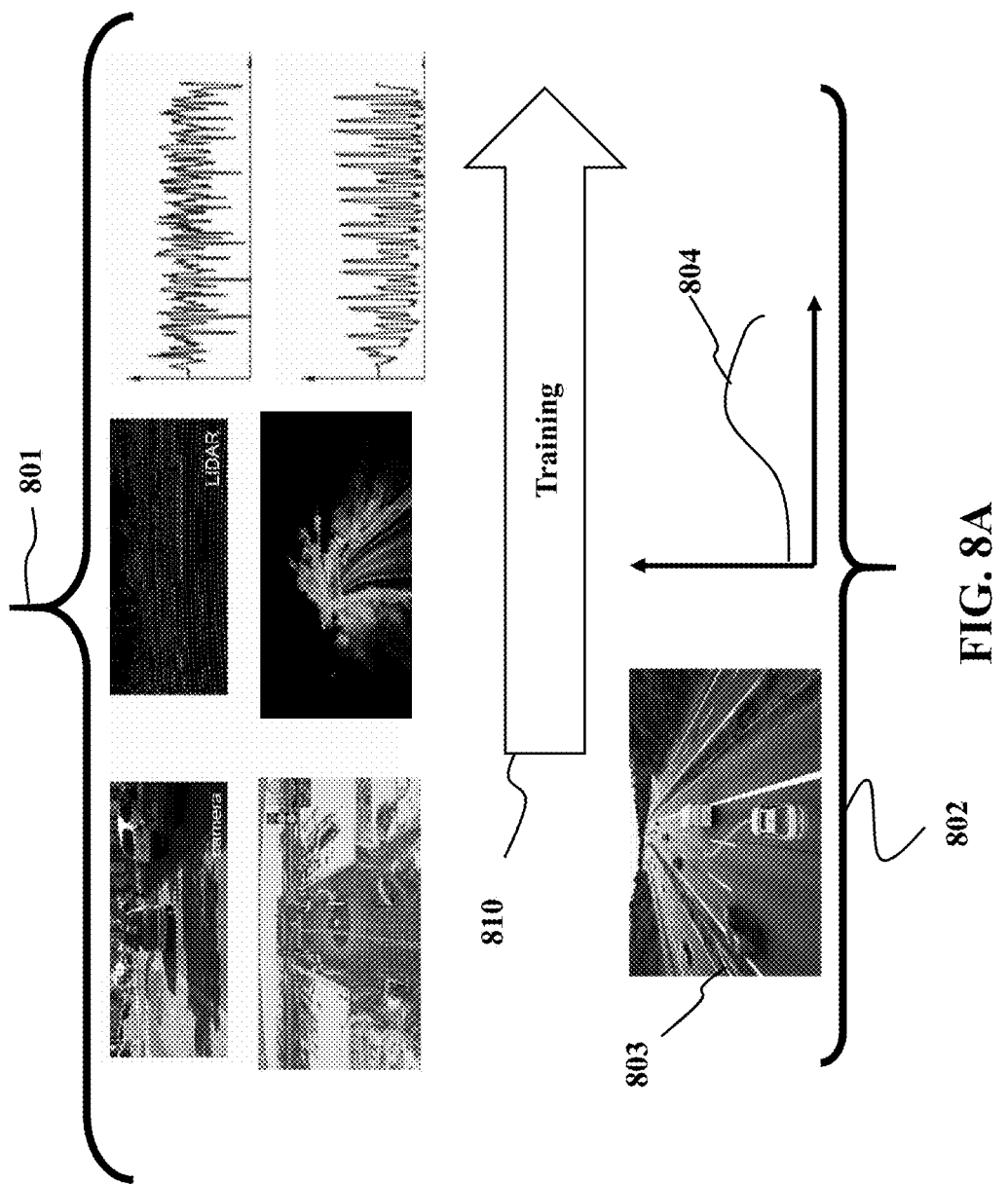
FIG. 8A and FIG. 8B show a schematic of training a neural network according to some embodiments of the present disclosure.
Figure 8B:
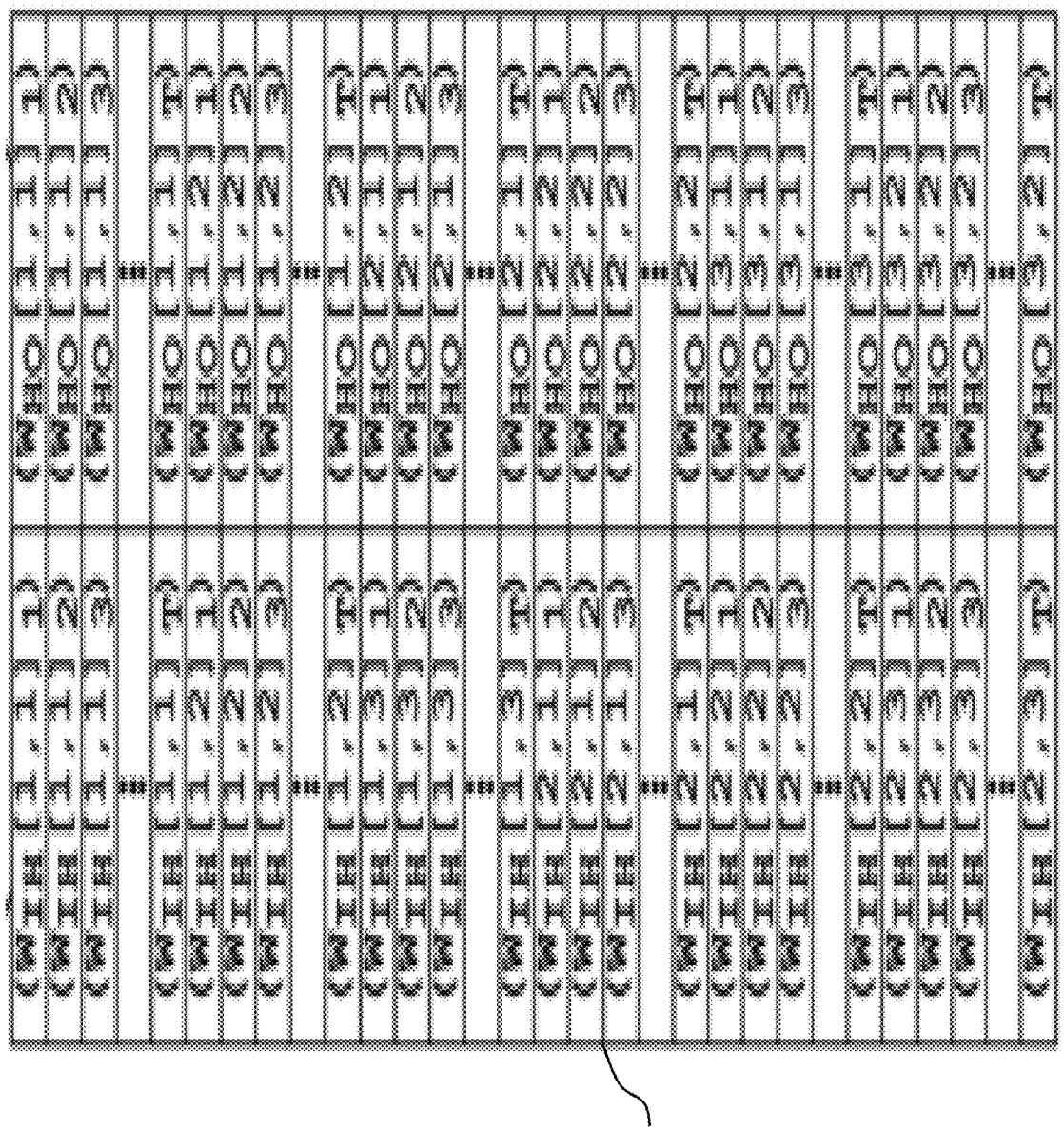

FIG. 8A and FIG. 8B show a schematic of training a neural network according to some embodiments. The training uses a training set of sequences of sensor inputs and corresponding heading, for example, behaviors, to produce the of the neural network behavior (for this example). In general, training a machine-learning algorithm comprises applying a training algorithm, sometimes referred to as a "learning" algorithm. A training set may include one or more sets of inputs and one or more sets of outputs with each set of inputs corresponding to a set of outputs. A set of outputs 802 of FIG. 8A in a training set comprises a set of outputs that are desired, for example for a neural network, to generate when the corresponding set of inputs 801 of FIG. 8A is inputted to the neural network.

For example, one embodiment trains a neural network. The training 810 of FIG. 8A involves constructing a function using coefficients or components of functions 820 of FIG. 8B that, when combined together in a way that has been obtained through learning, result in a function that maps a sequence of sensor data 801 to a desired heading, such as turn left or turn right.

Referring to FIG. 8A, another embodiment trains a neural network using rewards. The training 810 involves mapping a sequence of sensor data 801 to a future trajectory 802 indicative of the heading of the vehicle, such as path 803 of the vehicle using rewards 804, where the rewards of the deep neural network have been defined in advance. The rewards can, for example, can be selected based on a desired driving style and/or with respect to specification on the motion of the vehicle.

In some embodiments, the neural network consists of encoder and decoder networks in the form of recurrent neural networks for allowing dynamic temporal behavior of the resulting network. Various versions of recurrent neural networks, such as the long-term-short-term memory recurrent neural network, or the stacked recurrent neural network, can be utilized. A recurrent neural network can have several layers. Each layer can be a fully connected or convolutional.

The training data can include input time-series signals from the onboard sensors and the desired output vehicle trajectories, for example, but not necessarily, given as a sequence of Cartesian coordinates relative to the vehicle, or as a sequence of heading angles of the vehicle. In addition, the training data can include desired velocity profiles, for example given by a passenger of the vehicle, and the input data can be labeled according to the current driving style that is being trained. Several neural networks can be trained according to the number of preferred driving styles, and the corresponding labeled data tailors a neural network to every driving style.

For example, the operator or another user of the vehicle can choose the driving style to be used, or the operator can choose to let the vehicle decide the driving style that is suitable for the current user of the vehicle, which is then selected from the memory of the vehicle. The output trajectories can include velocity information or can be described without accompanying time information. The time-series signals are sent to the encoder network for computing the information indicative of the constraints on the motion of the vehicle. The information is then passed to the decoder network for generating an output trajectory matching the desired one. The mismatching between the generated trajectory and the desired trajectory provides a supervised signal for updating the neural network weights. The training can be achieved via an off-the-shelf feedforward neural network training algorithm such as the stochastic gradient descent with momentum algorithm. The decoder and encoder networks are trained together, because there is no output target for the encoder network and there is no input signal for the decoder network if the two networks are trained separately. Furthermore, the structure of the recurrent neural network ensures that the future trajectory can be learned by observing the past trajectory.

Training of the networks can also be done using simulated data that mimics different driving styles. With such an approach, although not perfectly matching real drivers, the training phase and the amount of data collection can be significantly decreased.

Features

Aspects of the control system can include the feedback controller can determine a value of a torque to reduce an error between the current heading of the vehicle and the desired heading of the vehicle, and commands a motor to rotate the wheels of the vehicle based on the determined torque. Wherein the desired heading can be modified by a constraint-enforcement algorithm, if the desired heading is determined to violate a prescribed constraint. Also, is possible for the reference governor to modify an amount of the desired heading, if one of the desired heading, the internal states of the vehicle system, the internal states of the feedback controller, or any combination thereof, result in causing a violation of prescribed constraints. Wherein the constraints are from the group consisting of a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels.

Another aspect of control system can include the applied torque input from the received signal causes a steering wheel angle to change when applied to the steering wheel of the vehicle, such that the feedback controller commands a motor of the vehicle to rotate the wheels based on a weighted combination of the torque applied to the steering wheel and the torque determined by the feedback controller. An aspect of the control system can include the feedback controller that can optimizes a cost function of an error between the current heading and the desired heading, subject to constraints on the movement of the vehicle.

Further still, an aspect can include a memory to store a function that includes a mapping of historical steering angles to desired historical headings of the vehicle with a historical velocity of the vehicle. A convertor determines the desired heading of the vehicle using the function and a current measured velocity of the vehicle, wherein the current measured velocity of the vehicle is obtained from the vehicle data. Wherein the mapping varies based on a velocity of the vehicle. Also, it is possible that the function can be a neural network trained to produce the desired heading of the vehicle based on the steering angle, the current heading of the vehicle, and an environment surrounding the vehicle. Further still, the function can include an inverse model of the steering system. The control system can further include a gate to pass to the feedback controller a value of the desired heading of the vehicle determined by the mapper when the vehicle is in a manual mode, and otherwise to pass to the feedback controller a value of the desired heading of the vehicle determined by a semi-autonomous driving planning (SADP) system to the feedback controller when the vehicle is in an autonomous mode. Wherein the gate includes a switch connecting either the mapper or the SADP system to the controller.

Another aspect of the controller system includes the feedback controller that can be continually controlling the movement of the vehicle so the vehicle tracks to the desired heading, if the vehicle is not tracking to the desired heading of the vehicle, then the feedback controller redirects the movement of the vehicle based on a redirecting model, that provides for redirecting the vehicle to the desired heading of the vehicle.

An aspect of the method can include the feedback controller determining a motor command based on the solution to a differential equation to reduce an error between the current heading of the vehicle and the desired heading of the vehicle, such that an amount of actuation by the motor command rotates a direction of the wheels of the vehicle steering system. Wherein the applied torque input received from the signal causes the steering angle to change when applied to the steering wheel, and wherein the determined motor command commands a motor of the vehicle to rotate the vehicle wheels based on a weighted combination of an amount of torque applied to the steering wheel, and the motor command determined by the feedback controller.

The method can further include determining a mode of driving the vehicle, wherein the mode is either a manual mode or an autonomous mode. Passing to the feedback controller a value of the desired heading of the vehicle mapped from the signal when the vehicle is in the manual mode; and otherwise. Passing to the feedback controller a value of the desired heading of the vehicle determined by a semi-autonomous driving planning (SADP) system when the vehicle is in the autonomous mode. Also, an aspect of the method can include the received signal being mapped to the desired heading of the vehicle based on a velocity of the vehicle.

FIG. 9 is a block diagram of illustrating the method of FIG. 1A, which can be implemented using an alternate computer or processor, according to embodiments of the present disclosure. The computer 911 includes a processor 940, computer readable memory 912, storage 958 and user interface 949 with display 952 and keyboard 951, which are connected through bus 956. For example, the user interface 949 in communication with the processor 940 and the computer readable memory 912, acquires and stores the measuring data in the computer readable memory 912 upon receiving an input from a surface, keyboard surface, of the user interface 957 by a user.

Contemplated is that the memory 912 can store instructions that are executable by the processor, historical data, and any data to that can be utilized by the methods and systems of the present disclosure. The processor 940 can be a single core processor, a multi-core processor, a computing cluster, or any number of other configurations. The processor 940 can be connected through a bus 956 to one or more input and output devices. The memory 912 can include random access memory (RAM), read only memory (ROM), flash memory, or any other suitable memory systems.

Still referring to FIG. 9, a storage device 958 can be adapted to store supplementary data and/or software modules used by the processor. For example, the storage device 958 can store historical device data and other related device data such as manuals for the devices, wherein the devices are sensing device capable of obtaining measured data as mentioned above regarding the present disclosure. Additionally, or alternatively, the storage device 958 can store historical data similar to the measuring data. The storage device 958 can include a hard drive, an optical drive, a thumb-drive, an array of drives, or any combinations thereof.

The system can be linked through the bus 956 optionally to a display interface (not shown) adapted to connect the system to a display device (not shown), wherein the display device can include a computer monitor, camera, television, projector, or mobile device, among others.

The computer 911 can include a power source 954, depending upon the application the power source 954 may be optionally located outside of the computer 911. A printer interface 959 can also be connected through bus 956 and adapted to connect to a printing device 932, wherein the printing device 932 can include a liquid inkjet printer, solid ink printer, large-scale commercial printer, thermal printer, UV printer, or dye-sublimation printer, among others. A network interface controller (NIC) 934 is adapted to connect through the bus 956 to a network 936, wherein measuring data or other data, among other things, can be rendered on a third party display device, third party imaging device, and/or third party printing device outside of the computer 911.

Still referring to FIG. 9, the measuring data or other data, among other things, can be transmitted over a communication channel of the network 936, and/or stored within the storage system 958 for storage and/or further processing. Further, the measuring data or other data may be received wirelessly or hard wired from a receiver 946 (or external receiver 938) or transmitted via a transmitter 947 (or external transmitter 939) wirelessly or hard wired, the receiver 946 and transmitter 947 are both connected through the bus 956. The computer 911 may be connected via an input interface 908 to external sensing devices 944 and external input/output devices 941. The computer 911 may be connected to other external computers 942. Further, the computer 911 can be connected a memory device 906 and sensors 904 and a control system for a vehicle 902. An output interface 909 may be used to output the processed data from the processor 940.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the various methods or processes outlined herein may be coded as software, as noted above, that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A control system for controlling a movement of a vehicle, comprising:
 a receiver to receive a signal indicative of a measured amount of a manually applied torque input to a steering wheel of the vehicle while the vehicle is in a manual mode, the received signal corresponds to an estimated driving objective of control of moving the vehicle toward the desired heading;
 a mapper to map the measured amount of the manually applied torque input of the received signal to the desired heading of the vehicle based on internal states of the vehicle that indicate a type of maneuver associated with the estimated driving objective of control that is attempted to be performed with the measured amount of the manually applied torque with which is actuating the steering wheel;
 a sensor to obtain vehicle data including a measure of a current heading of the vehicle, and
 wherein the feedback controller controls the movement of the vehicle causing the current heading of the vehicle to track the desired heading of the vehicle.

2. The control system of claim 1, wherein the feedback controller determines a value of a torque to reduce an error between the current heading of the vehicle and the desired heading of the vehicle, and commands a motor to rotate the wheels of the vehicle based on the determined torque.

3. The control system of claim 2, wherein the desired heading is modified by a constraint-enforcement algorithm, if the desired heading is determined to violate a prescribed constraint.

4. The control system of claim 2, wherein the reference governor modifies an amount of the desired heading, if one of the desired heading, the internal states of the vehicle system, the internal states of the feedback controller, or any combination thereof, will result in causing a violation of prescribed constraints.

5. The control system of claim 4, wherein the prescribed constraints are from the group consisting of a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels.

6. The control system of claim 1, wherein the manually applied torque input from the received signal is provided by a driver that causes a steering wheel angle to change when applied to the steering wheel of the vehicle, such that the feedback controller commands a motor of the vehicle to rotate the wheels based on a weighted combination of the torque applied to the steering wheel and the torque determined by the feedback controller.

7. The control system of claim 1, wherein the feedback controller optimizes a cost function of an error between the current heading and the desired heading, subject to constraints on the movement of the vehicle.

8. The control system of claim 1, further comprising:
a memory to store a function that includes a mapping of historical steering angles to desired historical headings of the vehicle with a historical velocity of the vehicle;
a convertor determines the desired heading of the vehicle using the function and a current measured velocity of the vehicle, wherein the current measured velocity of the vehicle is obtained from the vehicle data.

9. The control system of claim 8, wherein the mapping varies based on a velocity of the vehicle.

10. The control system of claim 8, wherein the function is a neural network trained to produce the desired heading of the vehicle based on the steering angle, the current heading of the vehicle, and an environment surrounding the vehicle.

11. The control system of claim 8, wherein the function includes an inverse model of the steering system.

12. The control system of claim 1, further comprising:
a manual mode and an autonomous mode, such that the feedback controller controls the vehicle steering in both the manual mode and the autonomous mode to control the movement of the vehicle;
a gate to pass to the feedback controller a value of the desired heading of the vehicle determined by the mapper when the vehicle is in the manual mode, and otherwise to pass to the feedback controller a value of the desired heading of the vehicle determined by a semi-autonomous driving planning (SADP) system to the feedback controller when the vehicle is in the autonomous mode.

13. The control system of claim 12, wherein the gate includes a switch connecting either the mapper or the SADP system to the feedback controller.

14. The control system of claim 1, wherein the feedback controller is continually controlling the movement of the vehicle so the vehicle tracks to the desired heading, if the vehicle is not tracking to the desired heading of the vehicle, then the feedback controller redirects the movement of the vehicle based on a redirecting model, that provides for redirecting the vehicle to the desired heading of the vehicle.

15. A method for controlling a movement of a vehicle in both a manual mode and an autonomous mode, wherein the method uses a processor coupled with stored instructions implementing the method, such that the instructions, when executed by the processor carry out at least some steps of the method, comprising:
receiving a signal indicative of a steering angle of a steering wheel of the vehicle, such that the received signal corresponds to an estimated driving objective of control of moving the vehicle toward the desired heading;
mapping the received signal to a desired heading of the vehicle using a mapper based on internal states of the vehicle that indicate a type of maneuver associated with the estimated driving objective of control that is attempted to be performed with the measured amount of the manually applied torque with which is actuating the steering wheel;
receiving vehicle data via a sensor, such that the vehicle data includes a measure of a current heading of the vehicle; and
controlling the movement of the vehicle using the feedback controller, for causing the current heading of the vehicle to track the desired heading of the vehicle.

16. The method of claim 15, wherein the feedback controller determines a motor command based on a motor command model that provides for reducing an error between the current heading of the vehicle and the desired heading of the vehicle, such that an amount of actuation by the motor command rotates a direction of the wheels of the vehicle steering system.

17. The method of claim 16, wherein the manually applied torque input received from the signal causes the steering angle to change when applied to the steering wheel, and wherein the determined motor command commands a motor of the vehicle to rotate the vehicle wheels based on a weighted combination of an amount of torque applied to the steering wheel, and the motor command determined by the feedback controller.

18. The method of claim 15, further comprising:
determining a mode of driving the vehicle, wherein the mode is either the manual mode or the autonomous mode;
passing to the feedback controller a value of the desired heading of the vehicle mapped from the signal when the vehicle is in the manual mode; and otherwise
passing to the feedback controller a value of the desired heading of the vehicle determined by a semi-autonomous driving planning (SADP) system when the vehicle is in the autonomous mode.

19. The method of claim 15, wherein the received signal is mapped to the desired heading of the vehicle based on a velocity of the vehicle.

20. A non-transitory computer readable storage medium embodied thereon a program executable by a processor for performing a method, the method uses a control system with a single controller such as a feedback controller for controlling a vehicle steering to controls a movement of a vehicle in both a manual mode and an autonomous mode, the method comprising:
receiving a signal indicative of a steering angle of a steering wheel of the vehicle, such that the received signal corresponds to an estimated driving objective of control of moving the vehicle toward the desired heading;

mapping the received signal to a desired heading of the vehicle using a mapper based on internal states of the vehicle that indicate a type of maneuver associated with the estimated driving objective of control that is attempted to be performed with the measured amount of the manually applied torque with which is actuating the steering wheel;

receiving vehicle data via a sensor, such that the vehicle data includes a measure of a current heading of the vehicle; and controlling the movement of the vehicle using the feedback controller connected to the processor, wherein a gate is to pass to the feedback controller a value of the desired heading of the vehicle determined by the mapper, when the vehicle is in the manual mode, and otherwise, to pass to the feedback controller a value of the desired heading of the vehicle determined by a semi-autonomous driving planning (SADP) system to the feedback controller, when the vehicle is in the autonomous mode, for causing the current heading of the vehicle to track the desired heading of the vehicle.

\* \* \* \* \*